US009714475B2

(12) United States Patent
Rubio et al.

(10) Patent No.: US 9,714,475 B2
(45) Date of Patent: Jul. 25, 2017

(54) METHOD FOR OBTAINING A COOKING VESSEL HAVING A COLORED HARD-ANODIZED OUTER FACE

(71) Applicant: SEB S.A., Ecully (FR)

(72) Inventors: Martin Rubio, Rumilly (FR); Stephane Tuffe, Cognin (FR)

(73) Assignee: SEB S.A., Ecully (FR)

( * ) Notice: Subject to any disclaimer, the term of this patent is extended or adjusted under 35 U.S.C. 154(b) by 213 days.

(21) Appl. No.: 14/382,699

(22) PCT Filed: Mar. 4, 2013

(86) PCT No.: PCT/FR2013/050460
§ 371 (c)(1),
(2) Date: Sep. 3, 2014

(87) PCT Pub. No.: WO2013/132185
PCT Pub. Date: Sep. 12, 2013

(65) Prior Publication Data
US 2015/0240377 A1    Aug. 27, 2015

(30) Foreign Application Priority Data

Mar. 7, 2012 (FR) ...................... 12 52086

(51) Int. Cl.
*A47J 36/02* (2006.01)
*A47J 31/10* (2006.01)
(Continued)

(52) U.S. Cl.
CPC ............ *C25D 11/243* (2013.01); *A47J 27/002* (2013.01); *A47J 36/02* (2013.01); *A47J 36/025* (2013.01);
(Continued)

(58) Field of Classification Search
CPC .......... A47J 36/02; A47J 36/025; A47J 37/10; C23C 2/38; C23C 2/00; C23C 2/02; B21C 37/09; B21C 37/06
(Continued)

(56) References Cited

U.S. PATENT DOCUMENTS 3,919,763 A * 11/1975 Ulam ................... A47J 27/002
219/121.14
4,526,842 A * 7/1985 Eide ........................ A47J 36/02
220/62.17
(Continued)

FOREIGN PATENT DOCUMENTS

CA    2246215        3/1999
CN    1683599 A     10/2005
(Continued)

*Primary Examiner* — Reginald L Alexander
(74) *Attorney, Agent, or Firm* — The Webb Law Firm

(57) ABSTRACT

Provided is a method for obtaining a cooking vessel comprising the following steps: producing a container having an aluminum outer face and an inner face, carrying out hard anodization of at least the outer face of the container. At least one coloring step is carried out on the anodized outer face following hard anodization, said coloring step employing at least one water-soluble anthraquinone organic dye. Also provided is a culinary article or an electric cooking appliance comprising a cooking vessel obtained by the above method.

17 Claims, 1 Drawing Sheet

(51) Int. Cl.
    *C25D 11/24*     (2006.01)
    *C23C 2/02*     (2006.01)
    *B21C 37/06*     (2006.01)
    *C23C 2/00*     (2006.01)
    *A47J 37/10*     (2006.01)
    *A47J 27/00*     (2006.01)
    *C25D 11/16*     (2006.01)
    *B65D 25/02*     (2006.01)
    *B65D 25/34*     (2006.01)

(52) U.S. Cl.
    CPC ............. *A47J 37/10* (2013.01); *A47J 37/105* (2013.01); *B21C 37/06* (2013.01); *B65D 25/02* (2013.01); *B65D 25/34* (2013.01); *C23C 2/00* (2013.01); *C23C 2/02* (2013.01); *C25D 11/16* (2013.01)

(58) Field of Classification Search
    USPC ................ 99/422; 126/390.1; 29/460, 527.1; 228/262.44, 262.5
    See application file for complete search history.

(56) References Cited

U.S. PATENT DOCUMENTS

| | | | | |
|---|---|---|---|---|
| 4,541,411 A * | 9/1985 | Woolf | ............... | A47J 36/02 126/390.1 |
| 6,092,520 A | 7/2000 | Hasegawa | | |
| 6,509,101 B2 * | 1/2003 | Fairbourn | ............... | A47J 36/02 106/14.14 |
| 6,696,553 B1 | 2/2004 | Korte | | |
| 7,037,591 B2 * | 5/2006 | Henze | ............... | A47J 36/02 126/19 R |
| 7,208,231 B2 * | 4/2007 | Groll | ............... | A47J 36/02 220/573.1 |
| 7,906,748 B2 | 3/2011 | Imura | | |
| 8,071,219 B2 | 12/2011 | Berrux et al. | | |
| 9,139,926 B2 * | 9/2015 | Musil | ............... | C25D 3/30 |
| 2005/0205582 A1 * | 9/2005 | Cheng | ............... | A47J 36/02 220/573.3 |
| 2010/0143622 A1 | 6/2010 | Schreuder | | |

FOREIGN PATENT DOCUMENTS

| | | |
|---|---|---|
| CN | 1785101 A | 6/2006 |
| CN | 102080245 A | 6/2011 |
| DE | 4439004 A1 | 5/1996 |
| EP | 0424072 A1 | 10/1990 |
| EP | 0902105 | 3/1999 |
| EP | 1894502 A1 | 3/2008 |
| FR | 1059522 | 3/1954 |
| GB | 1099486 | 1/1968 |
| JP | 622759 U | 2/1987 |
| JP | 11285447 A | 10/1999 |
| JP | 11346928 A | 12/1999 |
| JP | 2003504426 A | 2/2003 |
| JP | 2008518723 A | 6/2008 |
| JP | 2008154659 A | 7/2008 |
| JP | 2010510387 A | 4/2010 |
| JP | 2010248545 A | 11/2010 |
| JP | 2011200727 A | 10/2011 |
| WO | 2008/061555 A1 | 5/2008 |

* cited by examiner

METHOD FOR OBTAINING A COOKING VESSEL HAVING A COLORED HARD-ANODIZED OUTER FACE

CROSS-REFERENCE TO RELATED APPLICATIONS

This application is the United States national phase of International Application No. PCT/FR2013/050460 filed Mar. 4, 2013, and claims priority to French Patent Application No. 1252086 filed Mar. 7, 2012, the disclosures of which are hereby incorporated in their entirety by reference.

FIELD OF THE INVENTION

This invention pertains to the technical field of cooking appliances and utensils with a cooking vessel.

This invention pertains more specifically, but not exclusively, to culinary items such as saucepans, frying pans and woks, as well as electric cooking appliances with a container for holding food.

DESCRIPTION OF RELATED ART

There is a known method, as described in Document GB 1 099 486, of producing cooking vessels made of aluminum with a hard-anodized layer on the surface. This surface layer may, if desired, be colored. The surface thus obtained is easier to clean than a non-anodized surface. However, the surface thus obtained is not as easy to clean as a surface with a non-stick layer.

Document EP 0 424 072 and Document EP 0 902 105 describe the creation of cooking vessels with a non-stick coating such as PTFE on an aluminum frame with hard anodization. The hard anodization is therefore done prior to the PTFE coating. This arrangement improves the PTFE coating's resistance to wear and tear and to scratching. Ordinarily, the PTFE coating is used primarily to coat the interior surface of cooking vessels, due to the limited mechanical durability of this type of coating.

There is a known method, described in Document EP 1 894 502, of producing a sol-gel coating on at least one surface of a culinary item consisting of an aluminum or aluminum-alloy frame, and this frame can be made of anodized aluminum. That document describes an anodized layer thickness of between 5 and 100 μm. The other surface may, if desired, be coated in PTFE. The sol-gel coating improves the cooking vessel's resistance to the dishwasher, as well as the cooking vessel's flame resistance.

There is a known method, described in Patent Application FR 10 59522, of producing a cooking vessel with a colored hard-anodized exterior surface, for which a sol-gel coating is applied to the hard-anodized exterior surface. This procedure produces cooking vessels for which the coloring on the exterior surface is of a durable nature, and that are resistant to the washing agents used in dishwashers and to flame. One disadvantage of the production method described resides in the complexity of the process implemented, which requires many steps.

One objective of this invention is to offer coloring of the anodized exterior surface of a cooking vessel, which is durable, without requiring a protective coating.

Another objective of this invention is to provide coloring for the anodized exterior surface of a cooking vessel, which is resistant to the flames used for cooking or to any other source of heat used for cooking, without requiring a protective coating.

An additional objective of this invention is to provide coloring for the anodized exterior surface of a cooking vessel, which is compatible with a PTFE coating on the interior surface of said cooking vessel, without requiring a protective coating.

SUMMARY OF THE INVENTION

These objectives are met through a process for obtaining a cooking vessel consisting of the following steps:

Production of a container with an aluminum exterior surface and an interior surface, Performance of hard anodization on at least the exterior surface of the container, in which at least one coloring step is performed on the anodized exterior surface after hard anodization has been performed, said coloring step using at least one water-soluble anthraquinone organic dye. Surprisingly, testing has shown that coloring the anodized exterior surface of a cooking vessel, when done in this way, results in durability, even when the cooking vessel is exposed to flame, without requiring a protective layer such as a sol-gel, varnish, lacquer or PTFE coating.

According to one advantageous method of implementation, the coloring step uses an immersion in an aqueous solution of one or more water-soluble anthraquinone organic compound(s). The use of organic solvents can thus be avoided.

According to one preferred method of implementation, said process includes a step in which a PTFE coating is applied to the interior surface of the container. If desired, the PTFE coating step may include a surface preparation, as well as the application of one or more intermediate layers. The PTFE may be applied by coating, for example.

Thus, according to one method of implementation, the process includes a step in which a PTFE coating is applied to the interior surface of the container, and the step in which the exterior surface of the container is hard anodized occurs after the step in which the PTFE coating is applied to the interior surface of the container. The anodization performed after the PTFE coating offers the advantage of anodizing only the exterior surface of the container, which shortens the processing time, and decreases the consumption of electricity and acid as compared to the anodization of the exterior surface and the interior surface of the container. Moreover, PTFE supports the sulfuric acid bath usually used in anodization quite well.

If desired, the process may include a step in which preliminary hard anodization is performed on the exterior surface and the interior surface of the container prior to the step in which the PTFE coating is applied to the interior surface of the container, the hard anodization of the exterior surface of the container occurring after an etching step on the exterior surface of the container, following the step in which a PTFE coating is applied to the interior surface of the container. This preliminary hard anodization treatment pertains to the interior surface and the exterior surface of the container and produces a hard base prior to the application of the PTFE coating.

Without a PTFE coating, ideally the hard anodization step and the coloring step are performed on the interior surface and the exterior surface of the container.

According to one advantageous characteristic of the invention, the hard anodization is performed at a temperature of greater than or equal to 0° C. For lower anodization temperatures, the pores formed during anodization are indeed very dense and very small, and the anodized surface cannot be dyed.

According to another advantageous characteristic of the invention, the hard anodization is performed at a temperature of less than or equal to 17° C. For higher anodization temperatures, the pores formed during anodization are too large and the anodization is not hard enough, even if the dyeing is very effective.

According to one preferred characteristic of the invention, the hard anodization is performed at a temperature of between 5° C. and 12° C. For this range of temperatures, the pores formed during anodization are small enough for the anodized surface to be hard, and large enough for the anthraquinone dyes to be able to penetrate into the pores and color the hard-anodized surface.

These objectives are also reached with a cooking vessel obtained according to a process that possesses at least one of the aforementioned characteristics.

According to one advantageous method of implementation, the container is obtained by stamping a substrate with at least one surface made of aluminum, in which case said surface forms the exterior surface of the container.

Thus, according to one method of implementation, the substrate has two aluminum surfaces. For example, the substrate can be made of solid aluminum, or as a laminate with two aluminum surfaces and a steel core. If desired, the steel may be chosen from among the stainless steels.

Thus, according to another method of implementation, the substrate is formed by a laminate with one aluminum surface and one stainless steel surface, this stainless steel surface being advantageously intended to receive a PTFE coating.

According to another advantageous method of implementation, the container is made of aluminum casting.

According to one advantageous method of implementation, the exterior surface of the container has a brushed or microbead-blasted surface. The anodization treatment is a surface treatment in which the surface material is modified, and not a surface coating, in which one or more layers are added to an existing surface. Hard anodization treatment is not limited to smooth or polished surface conditions, and so anodization may be considered, for example, on a brushed or microbead-blasted surface.

Ideally, in order to obtain an induction-compatible cooking vessel, the container has at least one insert made of a ferromagnetic material.

These objectives are also met with a culinary item consisting of a cooking vessel and a handling instrument attached to said cooking vessel by at least one rivet or by welding, said cooking vessel possessing at least one of the aforementioned characteristics.

These objectives are also met with an electric cooking appliance, consisting of a cooking vessel combined with a heat source, said cooking vessel possessing at least one of the aforementioned characteristics.

BRIEF DESCRIPTION OF THE DRAWINGS

The invention will be better understood upon examining examples of implementation, which should in no way be taken as limiting, and which are illustrated in the attached drawings, in which.

DETAILED DESCRIPTION OF THE INVENTION

Figure 1:
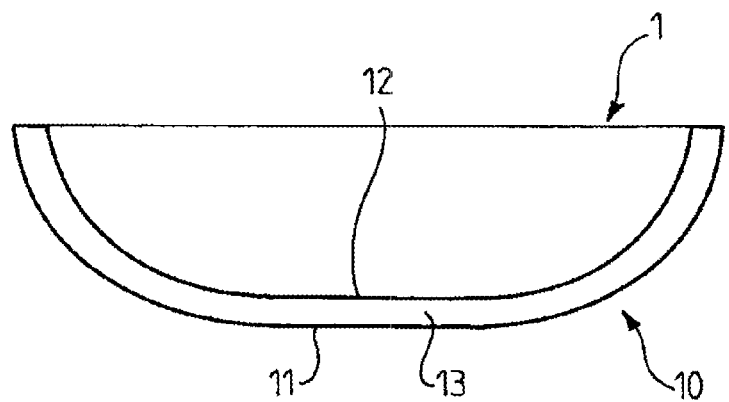
FIG. 1 depicts a cooking vessel (1) described in the invention.
Figure 2:
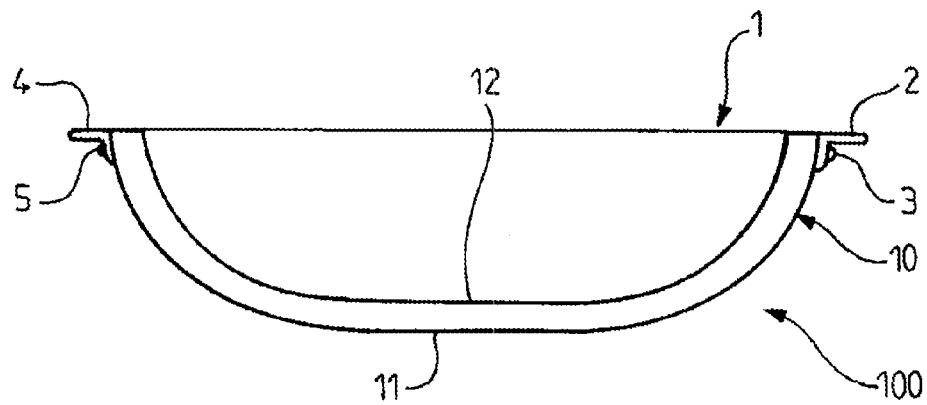
FIG. 2 depicts a culinary item (100) containing a cooking vessel (1) described in the invention.

The cooking vessel (1) depicted in FIGS. 1 and 2 has a container (10) with an exterior surface (11) made of aluminum as well as an interior surface (12).

According to one method of implementation, the container (10) is obtained by stamping a substrate (13) with at least one surface made of aluminum that is intended to form the exterior surface (11) of the container (10).

According to one method of implementation, the substrate (13) has two aluminum surfaces intended to form the exterior surface (11) and the interior surface (12), respectively, of the container (10).

If desired, the substrate (13) may be made of solid aluminum. An aluminum alloy (3003), for example, may also be used for this purpose. The substrate (13) used to form the container (10) is thus cut out of an aluminum sheet.

According to another method of implementation, the substrate (13) is formed by a laminate with one aluminum surface and one stainless steel surface, the aluminum surface being intended to form the exterior surface (11) of the container, and the stainless steel surface being intended to form the interior surface (12) of the container (10).

According to another method of implementation, the container (10) is made of cast aluminum, for example with an aluminum alloy AlSi12.

If desired, the exterior surface (11) of the container (10) is not necessarily smooth or polished, but may, for example, have a brushed or microbead-blasted surface.

If desired, the container (10) may have at least one insert made of ferromagnetic material, such as, for example, ferritic steel, to make a cooking vessel (1) that can be heated by induction. Preferably, the ferromagnetic material is a ferritic stainless steel. If desired, the insert made of ferromagnetic material may be formed by a plate with one or more perforations. The insert is ideally assembled by hot or cold heading with the aluminum in the substrate (13) or is covered in cast aluminum, the perforation(s) preferably being filled by the aluminum. The insert made of ferromagnetic material may have at least one part showing, which can be protected by masking in acid chemical baths, such as the anodization bath(s).

The cooking vessel (1) described in the invention is obtained according to a process consisting of the following steps:

Production of a container (10) with an exterior surface (11) made of aluminum and an interior surface (12), Performance of hard anodization on at least the exterior surface (11) of the container (10), in which at least one coloring step is performed on the anodized exterior surface following the hard anodization, said coloring step using at least one water-soluble anthraquinone organic dye.

The coloring step preferably uses an immersion in an aqueous solution of one or more water-soluble anthraquinone organic compound(s).

The anthraquinone dyes offer good resistance to temperatures that can exceed 300° C., this temperature being higher than the maximum temperatures stated for other organic dyes.

Anthraquinone dyes can be used to obtain colorings on the anodized exterior surface of a cooking vessel, which offer durability. The coloring step(s) use(s) a coloring bath containing anthraquinone organic compounds that will precipitate and be trapped inside the pores of the hard anodized layer. The addition of a protective coating no longer appears to be necessary to protect the coloring of the anodized exterior surface of the cooking vessel resting on a hotplate, or even exposed to a flame from a burner such as a gas burner.

According to one advantageous method of implementation, the coloring step uses an immersion in an aqueous solution of water-soluble anthraquinone organic compounds.

Testing conducted with "Sanodye Violet MRB New," "Sanodye Blue 2LW" and "Sanodye Blue G" dyes from OMYA showed surprisingly satisfactory durability of the coloring obtained at the temperatures at which cooking utensils are used, with thermal stability of the color up to 300° C. in a furnace, as well as after cooking to browning for 20 minutes over a gas burner.

Prior to coloring, the surfaces being colored are subjected to etching in an alkaline product followed by rinses and neutralization in an acid medium. If desired, a prior mechanical preparation may be performed, depending on the surface appearance sought, such as a polishing, brushing, sandblasting or shot-blasting mechanical preparation, for example. After neutralization, a brightening treatment may be performed by immersion in a phosphoric acid bath. The anodization step in a sulfuric acid solution is performed with an acid concentration of between 10 and 500 g/l, at a temperature of between −10° C. and +30° C., with a continuous current having a current density of between 0.1 and 5 A/dm$^2$. Testing has shown that in order to obtain anodization of sufficient hardness, the temperature of the anodization bath must be less than or equal to 17° C., and preferably less than or equal to 12° C.; to obtain coloring of the hard anodized surface, the temperature of the anodization bath must be greater than or equal to 0° C., and preferably greater than or equal to 5° C. The anodization process is followed by multiple rinses, the last of which is performed with demineralized water. This treatment range results in the formation of an anodized layer of variable thickness, depending on the treatment time, of 5 to 100 µm, and a hardness ranging from 100 to 600 Vickers.

Ideally, the coloring bath is composed of an aqueous solution containing between 0.1 and 10 g/l of anthraquinone dye. The aqueous solution is prepared with demineralized water. The pH obtained is between 4 and 6. The temperature of the coloring bath is between 20 and 80° C. The coloring time depends on the color sought and is typically between 1 and 60 minutes.

Preferably, the coloring step is followed by a rinsing step. The rinsing step may be followed by a sealing step. The sealing step may, for example, use boiling water, or saturated steam, or even a bath containing metal salts of nickel and/or lithium and/or silicon. However, the use of a sealing step does not seem to appreciably modify the durability of the coloring obtained.

The process ideally includes a step in which a PTFE coating is applied to the interior surface of the container. The PTFE coating step may, for example, be performed by a coating process. If desired, the PTFE coating step may use a filled PTFE, to improve the resistance of the interior surface (12) of the PTFE-coated container (10). Mineral particles may be used, for example, as reinforcement filling. To obtain the PTFE cooking surface, the PTFE coating is heated to a temperature of over 400° C. (usually on the order of 420° C.). Thus, the PTFE coating step is performed prior to the coloring step.

According to one method of implementation, the hard anodization step performed on the exterior surface (11) of the container (10) takes place after the PTFE coating step performed on the interior surface (12) of the container (10).

If desired, a preliminary hard anodization step performed on the exterior surface (11) and the interior surface (12) of the container (10) may be considered prior to the PTFE coating step performed on the interior surface (12) of the container (10). This prior hard anodization treatment can be done to obtain a hard base beneath the PTFE coating. The presence of a hard base beneath the PTFE coating improves the mechanical durability of the PTFE coating. Applying a PTFE coating after hard anodization is described, for example, in Document EP 0 902 105. However, etching of the exterior surface (11) of the container (10) is then necessary to re-anodize said exterior surface (11) before performing a coloring step. The hard anodization step performed on the exterior surface (11) of the container (10) then occurs after an etching step on the exterior surface (11) of the container (10), following the PTFE coating step performed on the interior surface (12) of the container (10).

According to another method of implementation, the hard anodization step may be performed on the interior surface (12) and the exterior surface (11) of the container (10), in order to obtain a hard base. The hard anodization step is then a dual-surface hard anodization step.

If desired, a surface preparation prior to hard anodization may include an acid- or base-type degreasing and/or an acid- or base-type etching, and/or HNO$_3$ neutralization. A few minutes of degreasing in a NaOH bath with a concentration of 50 g/l at a temperature on the order of 50° C. produces satisfactory results.

The hard anodization treatment can be applied by soaking in a bath. The preliminary anodization treatment may also be performed by soaking in a bath. Hard anodization offers the advantage of good scratch and impact resistance. A wider range of materials may also be considered for making the container (10), with respect to enameling, while retaining the cleaning properties conferred by the PTFE coating on the interior surface (12) of the container (10).

Hard anodization may, for example, be obtained with a H$_2$SO$_4$ bath at a concentration of 130 g/l for 90 minutes at a temperature on the order of 10° C. with a current density on the order of 1.8 A/dm$^2$. Lower temperatures of around 0° C. with a greater current density can shorten the treatment time.

An anodized layer with a thickness of between 10 µm and 100 µm produces satisfactory results for coloring options. Preferably, in order to obtain a hard anodized layer with sufficient mechanical durability, the anodized layer has a thickness of at least 25 µm. The hardness of the hard anodized layer thus obtained is greater than 350 Hv.

According to one preferred characteristic, the anodized exterior surface (11) has pores that are less than 30 nm in size, and preferably less than 20 nm.

The process described in the invention may include the following examples of implementation:

EXAMPLE 1

PTFE coating of the interior surface (12), hard anodization of the exterior surface (11), coloring of the hard anodized exterior surface (11).

EXAMPLE 2

Preliminary dual-surface hard anodization of the container (10) to obtain a hard base, PTFE coating of the interior surface (12), hard anodization of the exterior surface (11), coloring of the hard anodized exterior surface (11).

EXAMPLE 3

Dual-surface hard anodization of the container (10) to obtain a hard base, coloring of the hard anodized exterior surface (11) and the hard anodized interior surface (12).

FIG. 2 depicts a culinary item (100) consisting of a cooking vessel (1) and a handling instrument (2) attached to said cooking vessel (1) by at least one rivet (3). To this end, the rivet (3) is assembled in a hole in the container (10) of the cooking vessel (1). If desired, multiple rivets (3) may be used to attach the handling instrument (2) to the cooking vessel (1). Preferably between two and four rivets (3) are used to attach the handling instrument (2) to the cooking vessel (1). Alternatively, the handling instrument (2) may be welded to said cooking vessel (1). If desired, another handling instrument (4) may be attached to said cooking vessel (1) by at least one other rivet (5) or by welding.

Figure 3:
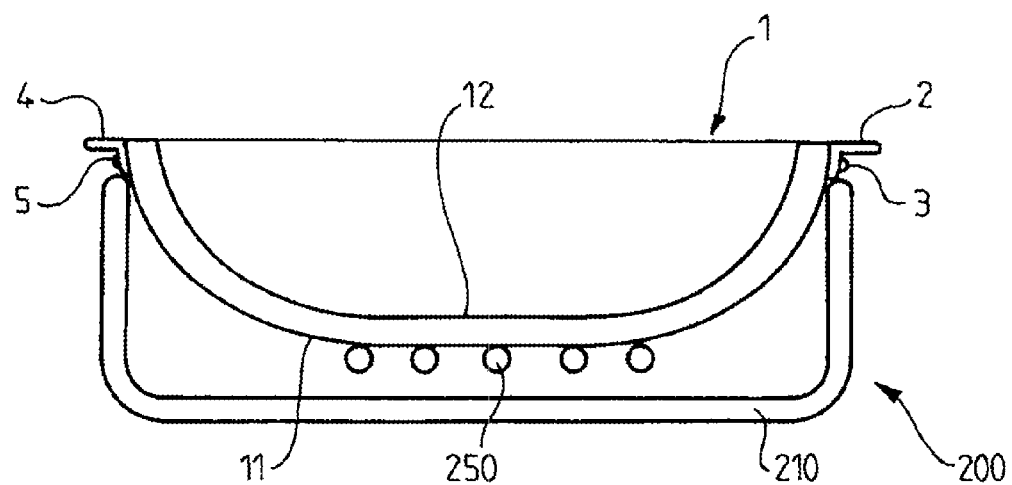
FIG. 3 is an illustration of an electric cooking appliance (200) containing a cooking vessel (1) described in the invention.

FIG. 3 depicts an electric cooking appliance (200), consisting of a cooking vessel (1) combined with a heat source (250). The cooking vessel (1) forms a container positioned in a heating base (210) containing a heat source (250). The exterior surface (11) of the container (10) rests on the heat source (250). If desired, the exterior surface (11) may be attached to the heat source (250).

As a variation, the interior surface (12) of the container (10) is not necessarily coated in PTFE; other coating types may be considered, if desired.

As a variation, the interior surface (12) of the container (10) is not necessarily coated. If desired, the interior surface (12) of the container (10) may be polished, for example.

This invention is in no way limited to the described examples of implementation, but encompasses many modifications within the context of the claims.

The invention claimed is:

1. Process of obtaining a cooking vessel, consisting of the following steps:
   Production of a container with an exterior surface made of aluminum and an interior surface,
   Performance of hard anodization on at least the exterior surface of the container,
   wherein at least one coloring step is performed on the anodized exterior surface after the hard anodization is performed, and wherein said coloring step uses at least one water-soluble anthraquinone organic dye,
   the process further including a step in which a PTFE coating is applied to the interior surface of the container, and wherein the step in which hard anodization is performed on the exterior surface of the container occurs after said step in which said PTFE coating is applied to the interior surface of the container.

2. Process of obtaining a cooking vessel described in claim 1, wherein the coloring step uses an immersion in an aqueous solution of one or more water-soluble anthraquinone organic compound(s).

3. Process of obtaining a cooking vessel described in claim 1, including a step in which preliminary hard anodization is performed on the exterior surface and on the interior surface of the container prior to the step in which the PTFE coating is applied to the interior surface of the container, and in that the step in which hard anodization is performed on the exterior surface of the container occurs after an etching step on the exterior surface of the container, following the PTFE coating step on the interior surface of the container.

4. Process of obtaining a cooking vessel described in claim 1, wherein the hard anodization is performed at a temperature of greater than or equal to 0° C.

5. Process of obtaining a cooking vessel described in claim 4, wherein the hard anodization is performed at a temperature of less than or equal to 17° C.

6. Process of obtaining a cooking vessel described in claim 1, wherein the hard anodization is performed at a temperature of between 5° C. and 12° C.

7. Process of obtaining a cooking vessel described in claim 3, wherein the coloring step uses an immersion in an aqueous solution of one or more water-soluble anthraquinone organic compound(s).

8. Cooking vessel, obtained according to the process of claim 1.

9. Cooking vessel described in claim 8, wherein the container is obtained by stamping a substrate with at least one surface made of aluminum.

10. Cooking vessel described in claim 9, wherein the substrate has two aluminum surfaces.

11. Cooking vessel described in claim 9, wherein the substrate is made of solid aluminum.

12. Cooking vessel described in claim 9, wherein the substrate is formed by a laminate with one aluminum surface and one stainless steel surface.

13. Cooking vessel described in claim 8, wherein the container is made of cast aluminum.

14. Cooking vessel described in claim 8, wherein the exterior surface of the container has a brushed or microbead-blasted surface.

15. Cooking vessel described in claim 8, wherein the container has at least one insert made of ferromagnetic material.

16. Culinary item consisting of a cooking vessel and a handling instrument attached to said cooking vessel by at least one rivet or by welding, wherein said cooking vessel meets the description in claim 8.

17. Electric cooking appliance, consisting of a cooking vessel combined with a heat source, wherein said cooking vessel meets the description in claim 8.

* * * * *